United States Patent [19]
Elliott

[11] 4,439,927
[45] Apr. 3, 1984

[54] TAPE MEASURE
[76] Inventor: Larry E. Elliott, W. 10 Mile Rd., Apt. 9, Southfield, Mich. 48034
[21] Appl. No.: 457,620
[22] Filed: Jan. 13, 1983
[51] Int. Cl.³ ............................ G01B 3/12; B43L 9/04
[52] U.S. Cl. ........................................ 33/189; 33/138
[58] Field of Search ................. 33/189, 18 R, 137 R, 33/138, 140, 84.8, 107; 242/84.8

[56] References Cited
U.S. PATENT DOCUMENTS

| | | | |
|---|---|---|---|
| 2,536,766 | 1/1951 | Pechstein | 242/84.8 |
| 2,624,120 | 1/1953 | Mills | 33/189 |
| 3,063,157 | 11/1962 | Keene | 33/189 |
| 3,336,678 | 8/1967 | Chamberlain et al. | 33/189 |
| 3,731,389 | 5/1973 | King | 33/189 |
| 3,802,083 | 4/1974 | Freed | 33/138 |
| 4,293,058 | 10/1981 | Burton | 242/84.8 |

Primary Examiner—Willis Little
Attorney, Agent, or Firm—Krass and Young

[57] ABSTRACT

A tape measuring device including an outer casing and a coiled metal tape disposed within the casing which may be retracted or withdrawn through a slot in the front of the casing. In addition, a consumable marker and a scriber are disposed within the casing immediately forward of and along side of the slot through which the coiled tape is withdrawn. Either the consumable marker or the scriber may be positioned via manual actuating means to mark an object being measured at a preselected point along the length of the extended tape. Braking means are disposed within the casing which, when actuated, engage the tape and lock it into position relative to the casing. The braking mechanism is automatically activated when either the consumable marker or the scriber is positioned for marking the object being measured. In addition, the braking means may be activated without marking or engraving the object being measured. A plurality of feed segments disposed within the casing operate to insure that the marker continues to contact the workpiece even though its length is diminished over a period of usage.

11 Claims, 6 Drawing Figures

TAPE MEASURE

DESCRIPTION

1. Technical Field

This invention relates generally to measuring devices and, more particularly, to tape measuring devices containing means for marking or engraving articles.

2. Background Art

Tape measuring devices employing a coiled tape which may be slidably extended from a slotted housing for measuring an article are widely known in the art. Similarly, there have been several attempts to mount marking means on tape measuring devices in order to mark the desired measurement on the article.

One example of such a device is that disclosed in U.S. Pat. No. 3,802,083 to Freed. Freed discloses an attachment for a tape measuring device which employs a marking device mounted in an elongate housing with actuating means for manually imposing said marking means upon the article being measured. Freed also shows a pointer which is also mounted in the elongate housing and is slidably positioned to bear upon the top face of the extended tape as the marker is imposed upon the surface of the article in order to signal the exact tape position of the mark being made. It is also intended that the pointer secure the tape in position relative to the article as the mark is made.

However, as with the other devices which have attempted to incorporate a marking element into a tape measuring device, the Freed device has several deficiencies. As the marking element tip wears down, the marker element must be manually adjusted in order that it contact the item simultaneous to the pointer contacting the tape. In addition, the marking element must be at least long enough to extend from its mount to the surface of the article. When the marker element becomes shorter than this minimum length, it is practically unusable.

In the Freed device, the pointer arrests movement of the tape only so long as the device is held secure to the surface of the article. While several methods of locking the tape are known in the art, these locking mechanisms are manually engaged in an operation which is separate from the marking operation thus requiring two steps to lock the tape and mark the article at a desired length.

Accordingly, the present invention is directed to overcoming one or more of the problems as set forth above.

DISCLOSURE OF THE INVENTION

In accordance with one aspect of the present invention, a tape measuring device includes a casing with a coiled metal tape disposed within the casing which can be withdrawn through a slot in the casing for the purpose of measuring distance. Marking means is mounted within the casing to allow for marking an article being measured. In addition, means are provided for locking the extended tape in its current position simultaneous to actuating the marking means.

A manually operated actuator shaft is provided to engage the marking device and urge it into position to mark the article being measured. As the actuator shaft urges the marking device into position, it activates a tape braking mechanism which engages the tape and locks it in a fixed position relative to the casing.

According to another feature of this invention, a consumable marker is disposed within a feed mechanism within the casing which automatically maintains the consumable marker in the proper position for marking as the marker is consumed. This feed mechanism features a carrier unit in which the consumable marker is disposed. A series of horizontal feed segments are also contained in the carrier unit. These horizontal feed segments are stacked vertically within the carrier unit such that an end face of each of the feed segments contacts the marker along its length. The feed segments are spring loaded so that they are urged in a horizontal direction towards the consumable marker. As the length of the marker diminishes, the feed segments are urged into position above the top of the consumable marker thus enabling the downward force of the actuating shaft to be transmitted by the feed segments to the shortened marker.

In accordance with another feature of this invention, a scriber is mounted within the casing immediately along side the consumable marker. A second actuator shaft is provided for positioning the scriber to engrave the article being measured at a preselected length. This second actuator shaft will also simultaneously activate the tape braking mechanism as it is positioning the scriber. The first and second actuating shafts are positioned along side each other so that both the scriber and marker may be activated at the same time.

BEST MODE FOR CARRYING OUT THE INVENTION

Figure 1:
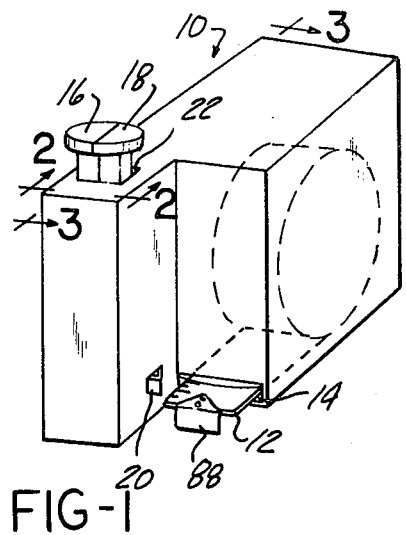
FIG. 1 is a perspective view of an embodiment of the present invention.

Referring to FIG. 1, in one embodiment of the current invention there is provided a casing 10 with a coiled metal tape 12 disposed within the casing 10 such that the coiled tape 12 may be extended or retracted through a slotted opening 14 in the casing 10.

Figure 2:
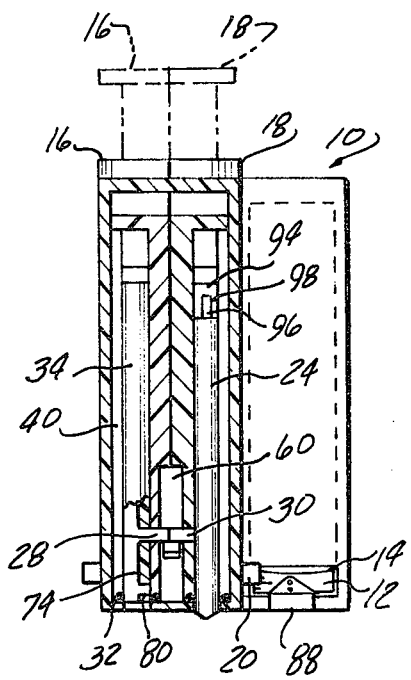
FIG. 2 is a cross-sectional view taken along the line 2—2 of FIG. 1.

As most clearly shown in FIG. 2, two marking elements such as a consumable marker 34 and a scribe 24 are disposed within the casing and are positioned immediately forward of and along side the slotted opening 14 through which the coiled tape 12 is extended. However, a single marking or scribing means may be employed without departing from the spirit of applicant's invention. A pair of actuator shafts 16 and 18 extend through an opening 22 in the top of the casing 10. The downward force on either of the actuator shafts 16 or 18, or both actuator shafts 16 and 18 simultaneously, will be transmitted to consumable marker 34 or a scriber 24, thus positioning the consumable marker 34 or the scriber 24 for marking an item at the length indicated on the extended tape 12.

As will be appreciated by those skilled in the art, the employment of both a consumable marker 34 and a scriber 24 in a single device is of significant utility. The consumable marker 34 consists of any of a variety of materials such as crayon, chalk, lead, soap stone or tailor's crayons. Materials of this type provide a highly visable mark which may be readily removed from most items.

The scriber 24 may be made of any hard material such as stainless steel which would provide a pinpoint engraving on the item being marked. It should be noted that both the consumable marker 34 and the scriber 24 might be employed to mark a single position. Marking the desired position with the scriber provides an accurate, indellible mark. Marking that same position with the more visable consumable marker 34 allows for quick location of the mark made by the scriber 24.

An indicator of tab 20 is provided on the sidewall of the casing 10 in a position which is colinear with both of the marking means 34 and 24 and immediately adjacent to the extended tape 12. Thus, one may mark the article being measured at a preselected position by aligning the witness tab 20 with the corresponding position on the extended tape 12 and depressing the appropriate actuator shaft 16 or 18.

It will be appreciated by those skilled in the art that a second witness tab could be located on the opposite sidewall of the casing 10 in line with the consumable marker, scriber and the first witness tab. This second witness tab would be particularly useful in determining the location of a mark made by the consumable marker which is nearest the outer sidewall of the casing 10.

Reference to FIG. 2 will reveal that consumable marker 34 and scriber 24 is mounted along a line which is perpendicular to the edge of the extended tape 12. Each of the markers 34 and 24 is shown in a retracted position. Also shown are contact arms 28 and 30 which protrude from each of the actuator shafts 16 and 18 respectively. These contact arms will bear upon the end of the spring steel braking arm 26 whenever either of the actuating shafts 16 or 18 is depressed. As will be described, the braking mechanism is activated simultaneous with the activation of either of the actuator shafts for marking the item to be measured.

Figure 3:
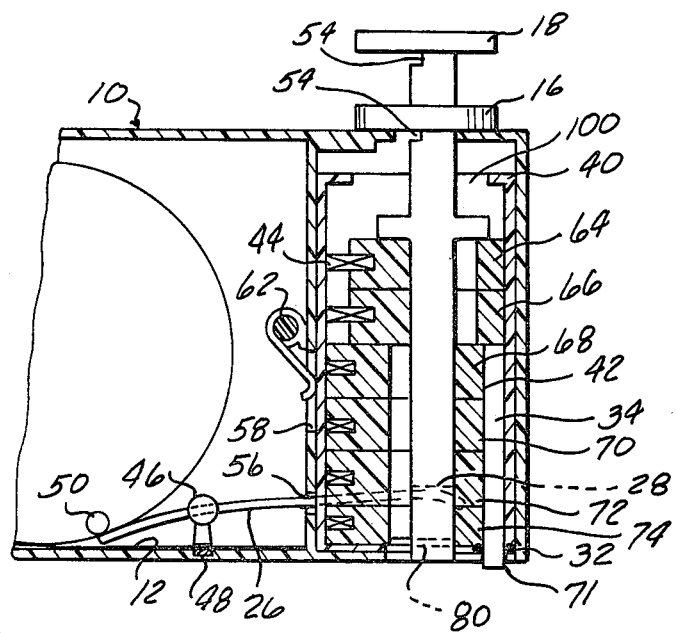
FIG. 3 is a cross-sectional view taken along line 3—3 of FIG. 1, and showing the consumable marker in the marking position.

FIG. 3 shows the tape braking mechanism and the feed mechanism for the consumable marker employed in the preferred embodiment of the invention. The tape braking mechanism consists of a flexible braking arm 26 to which a tape brake 46 is mounted. The braking arm 26 may be made of any material which will provide a spring action when it is flexed, such as spring steel.

The tape brake 46 may be made from any rigid material, preferably molded plastic, and consists of a shaft 36 which extends in a direction perpendicular to the braking arm 26 and parallel to the surface of the tape 12, and an elongate tongue section 38 which extends from the lower surface of the shaft 36. The tape brake 46 is mounted upon the spring steel braking arm 26 by virtue of a slot in the shaft 36 of the tape brake 46 through which the braking arm 26 passes. The lower tongue portion 38 of the tape blade 46 is positioned along the length of the shaft 36 of the tape brake 46 such that, when the tape brake 46 engages the tape 12 the tongue portion 36 of the tape brake 46 contacts the tape 12 across substantially the entire width of the tape 12.

When in the engaged position the lower portion of the tape brake 46 bears down upon the top surface of the tape 12 and upon a brake pad 48 which contacts the bottom surface of the tape 12. The braking arm 26 is secured at one end by an anchoring element 50 which may be molded directly into the casing 10.

The braking arm 26 enters through an opening 56 in the wall of the casing 10 and extends through a slot 60 formed by recesses in the opposing faces of the actuator shafts 16 and 18 as best shown in FIG. 2. As either of the actuator shafts 16 or 18 is depressed, contact arm 28 or 30 bears down upon the braking arm 26 causing it to flex, with the sidewall of the casing at the opening 56 acting as a fulcrum for the braking arm 26. As the braking arm 26 bends, the tape brake 46 is rotated into position, contacting the tape 12 and securing it between the tongue of the tape brake 46 and the brake pad 48 on the opposite face of the tape 12. When the downward force is removed from the actuator shaft 16 or 18, the spring action of the braking arm 26 urges the actuator shaft 16 or 18 upward in the casing 10 to its retracted position. The braking arm 26 then assumes its relaxed position, and the tape brake 46 is lifted off of the face of the tape 12, thus disengaging the tape as shown in FIG. 3.

Either of the actuator shafts 16 or 18 may be downwardly positioned to engage the brake mechanism without forcing the corresponding markers 34 or 24 into marking position by providing detents at an intermediate position (not shown) on the actuator shafts 16 or 18 which may be slidably engaged with the casing 10 at the shoulder 52.

FIG. 3 also illustrates the positions of the various elements in the feed mechanism for the consumable marker 34 when the consumable marker 34 is in the retracted position. A carrier 40 is provided which houses the consumable marker 34 and a series of horizontal feed segments 64-74 which are mounted in a vertical fashion within the carrier 40 so that they contact the consumable marker 34 along substantially the entire length of the marker 34. For example, spring 44 contacts the sidewall of the carrier 40 and urges the horizontal feed segment 64 towards the consumable marker 34. The first actuator shaft 16 runs throughout the length of the carrier unit and through a narrow center section of each of the horizontal feed segments 64-74 into the upward position.

A spring mechanism 62 is mounted upon the inner wall of the casing 10 immediately adjacent to the outer surface of the carrier 40. The spring 62 projects through an opening 58 in the wall of the casing 10, and bears upon the surface of the carrier, insuring that the carrier unit remains aligned with the opening 70 in the casing 10 through which the marker 34 passes.

Figure 4:
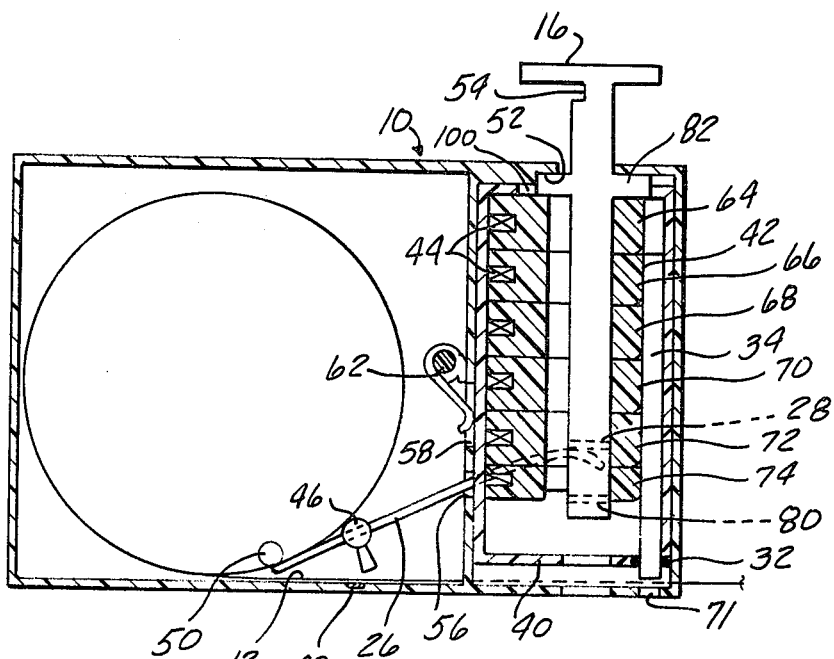
FIG. 4 is a cross-sectional view taken along line 3—3 of FIG. 1, and showing the consumable marker in the retracted position.
Figure 6:
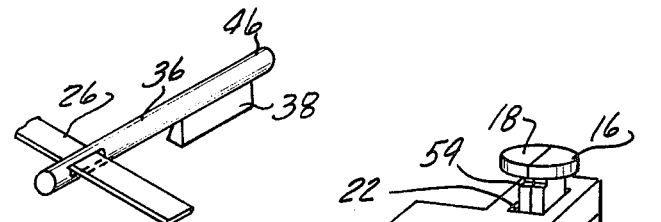
FIG. 6 is a perspective view of the tape brake assembly of the preferred embodiment.

Referring to FIG. 4, as the first actuator shaft 16 is depressed, the actuator arm 82 moves through an opening 100 in the carrier 40 and bears down upon the top of the consumable marker 34 and the stack of horizontal feed segments 64-74. As the segment stack 64-74 is pushed into contact with the bottom face of the carrier 40, the carrier 40 moves downward until the carrier contacts the bottom face of the outer casing 10. At this point, the consumable marker 34 is projected through a hole 71 in the outer casing 10 and is in marking position.

It should be noted that, when the first actuator shaft 16 is released, the spring action of the braking arm moves the actuator shaft upward. Thus, the force of the lower contact arm on the feed segment stack forces the feed segment stack upward. When the stack of horizontal feed segments 64-74 contacts the upper surface of the carrier 40, the carrier 40 is then urged upward until it contacts the upper surface of the outer casing 10, leaving the consumable marker 34 in the retracted position. However, the marker itself, has been maintained in a fixed position relative to the carrier 40 by a relatively elastic retainer ring 32 which is mounted on the carrier 40 at the opening 70 through which the consumable marker 34 is issued.

As the consumable marker 34 is diminished in size to an extent greater than the height of the top horizontal feed segment 64, that horizontal feed segment 64 will be urged in a position over the consumable marker 34 when the feed mechanism is in its retracted position. Similarly, each of the subsequent horizontal feed segments will be urged into position above the marker as it continues to diminish in length. Thus, as the horizontal feed segments replace the void left due to the consumption of the consumable marker 34, the downward force of the upper contact arm 82 is transmitted by the displaced horizontal feed segments to the diminished consumable marker 34. FIG. 3 shows a consumable marker 34 which has been diminished in size to the extent that each of the horizontal feed segments 64 and 66 has been positioned above the consumable marker 34.

The feed mechanism for the scriber element 24 is best shown in FIG. 2 and includes a second actuator shaft 18 which is a mirror image design of the first actuator shaft 16, a scriber feed segment 94 contained within the casing 10, and the scriber 24. The scriber feed segment features a recess 98 which accomodates a scriber shaft end 96. Any downward motion of the actuator shaft 18 is transmitted by the scriber feed segment 94 to the top of the scriber 96, forcing the scriber 96 downward through an opening in the casing 10 into marking position.

The rear edge of the opening 22 in the casing 10 contains a shoulder portion 52 which serves as a detent for each of the actuator shafts 16 and 18. As best shown in FIG. 3, as the actuator shaft 16 is depressed, it may be slidably positioned such that the shoulder portion 52 of the casing 10 engages a slot 54 on the shaft, thus securing the consumable marker 34 in marking position. As previously mentioned, other slots may be provided at intermediate positions along the actuator shafts 16 and 18 which, when engaged with the shoulder 52, would maintain the shaft in a position which actuates the braking mechanism but does not place the consumable marker 34 or the scriber 24 in marking position.

Figure 5:
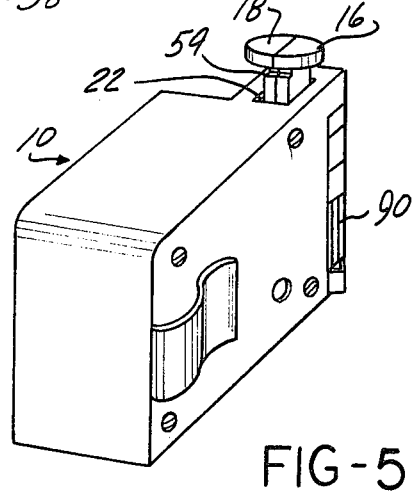
FIG. 5 is another perspective view of the preferred embodiment.

As shown by FIG. 5, a viewing window 90 composed of plastic or any other suitable transparent material may be located at the front outer corner of the measuring device so as to provide easy monitoring of the consumable marker supply.

In its normal operation, the tab end 88 of the tape would be fixed on one edge of the article to be measured and the tape would be extended to some preselected distance. This distance would be marked on the article being measured by depressing either of the actuator shafts 16 or 18 depending on what type of mark is desired. The tape braking mechanism would allow the operator to lift the tape measuring device from the article and position it at a different point along the edge from the article while this tape remained in its preselected extended position. Both of the actuator shafts 16 and 18 may be depressed simultaneously at each position where both an accurate engraving and a highly visable mark necessary for locating the engraving is desired.

Other aspects, objects and advantages of this invention can be obtained from a study of the drawings, the disclosure and the appended claims.

I claim:
1. A tape measuring device comprising:
   a casing;
   a coiled metal tape disposed within the casing, said coiled tape bearing indicia for ascertaining the length thereof;
   a slot in the casing from which said coiled tape may be withdrawn and retracted;
   marking means disposed within the casing for marking an article being measured;
   braking means disposed within the casing and above the tape, said braking means including a member pivotally mounted within the casing and having a brake portion adapted to press downwardly on an upper surface of the tape for maintaining said coiled tape in a fixed position relative to the casing; and
   actuating means adapted to contact the marking means and an end portion of the member spaced from the brake portion, for simultaneously positioning the marking means and pivoting the brake member so as to bring the brake portion into contact with the upper tape surface to secure the metal tape at a preselected position.

2. The tape measuring device of claim 1 wherein said braking means comprises:
   a flexible arm contacting said actuating means;
   a brake pad, said brake pad being fixedly secured to the bottom of the casing abutting one face of the tape;
   a tape brake, said tape brake being mounted on the flexible arm so that it may be movably positioned to abut one face of the coiled tape and sandwich it against the brake pad abutting the opposite face of the tape;
   whereby downward motion of the actuator means flexes against the flexible arm and positions the tape brake against one face of the coiled tape securing the coiled tape to thereby hold the tape in an extended position.

3. The tape measuring device of claim 2 wherein said actuating means is a shaft which, when depressed, urges the marking means towards the article being measured, thereby positioning the marking means for marking the article being measured.

4. The tape measuring device of claim 1 wherein said marking means is located immediately forward and along side of the slot in the casing from which said coiled tape is withdrawn and retracted.

5. The tape measuring device of claim 4 including one or more witness tabs mounted immediately adjacent the edge of the extended tape on a section of the casing which houses the marking means or on the side of said casing section opposite to the side which is adjacent to the extended tape, said witness tabs being located along a line which is perpendicular to the edge of the extended tape and containing the point at which the marking means contacts the surface of the article being measured, whereby the exact position of the mark may be ascertained by reading the tape at a point corresponding to said witness tabs.

6. A tape measuring device comprising:
   a casing;
   a coiled metal tape disposed within the casing, said tape bearing indicia for ascertaining the length thereof;
   a slot in said casing from which said coiled tape may be withdrawn and retracted;

braking means disposed within the casing for maintaining said coiled tape in a fixed position relative to the casing;

a carrier unit disposed within the casing;

consumable marking means located within the carrier unit for marking an article being measured;

actuating means for movably positioning the consumable marking means in order to mark an article and simultaneously activating said braking means to secure the metal tape at a preselected position;

space supplanting means for filling the space created in the carrier above the consumable marking means as the consumable marking means is consumed;

securing means for maintaining the consumable marking means in a fixed position relative to the carrier;

whereby, as the consumable marking means is diminished in length, the space supplanting means will transmit the positioning force applied to the actuating means to the consumable marking means.

7. The tape measuring device of claim 6 wherein said actuating means is a shaft which, when depressed, urges the space supplanting means, the consumable marking means, and the carrier downward toward the article being measured, thereby positioning the consumable marking means for making the article being measured.

8. The tape measuring device of claim 7 wherein said space supplanting means comprises a series of horizontal feed segments stacked vertically upon each other within the carrier unit such that one end face of each of the horizontal feed segments is in direct contact with one side of the consumable marking means along substantially the entire length of the consumable marking means, said horizontal feed segments being spring loaded at the end opposite the end in contact with the consumable marking means, thereby providing a horizontal force in the direction of said consumable marking means;

whereby as the consumable marking means is diminished in length to an extent greater than the height of one of the horizontal feed segments, the horizontal feed segment immediately below said actuator shaft will be urged over the top of the marking means, the horizontal feed segments thereby transmitting the downward positioning forces from the actuator shaft to the consumable marking means.

9. The tape measuring device of claim 8 wherein said securing means is a relatively elastic ring fixably mounted on the carrier at the exit point of the consumable marking means and through which the consumable marking means is positioned.

10. A tape measuring device comprising:

a coiled metal tape disposed within a casing, said coiled tape bearing indicia for ascertaining the length thereof;

a slot in said casing from which said coiled tape may be withdrawn and retracted;

braking means disposed within the casing for maintaining said coiled tape in a fixed position relative to the casing;

scribing means disposed within said casing for marking the article being measured;

scribing means disposed within said casing for engraving the article being measured;

first actuating means for movably positioning said marking means in order to mark the article being measured;

second actuating means for movably positioning said marking means in order to mark the article being measured;

said first and second actuating means being connected to the braking means to activate same upon manual depression;

whereby, the first actuating means and the second actuating means may be individually or selectively depressed to mark or engrave the article being measured and activate said braking means to secure the metal tape at a preselected position.

11. The tape measuring device of claim 10 wherein said braking means includes a member pivotally mounted within the casing and having a portion adapted to contact a surface of the tape, whereby activation of either the first or second actuating means pivots the pivotally mounted member causing the end portion to impinge upon a surface of the tape and thereby hold the tape in an extended position.

* * * * *